(12) United States Patent
Nazari et al.

(10) Patent No.: US 10,776,033 B2
(45) Date of Patent: Sep. 15, 2020

(54) REPURPOSABLE BUFFERS FOR TARGET PORT PROCESSING OF A DATA TRANSFER

(71) Applicant: HEWLETT PACKARD ENTERPRISE DEVELOPMENT LP, Houston, TX (US)

(72) Inventors: Siamak Nazari, Fremont, CA (US); Roopesh Kumar Tamma, Fremont, CA (US); Ajitkumar A Natarajan, Fremont, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 279 days.

(21) Appl. No.: 15/120,826

(22) PCT Filed: Feb. 24, 2014

(86) PCT No.: PCT/US2014/018073
§ 371 (c)(1),
(2) Date: Aug. 23, 2016

(87) PCT Pub. No.: WO2015/126429
PCT Pub. Date: Aug. 27, 2015

(65) Prior Publication Data
US 2017/0075625 A1    Mar. 16, 2017

(51) Int. Cl.
  *G06F 3/06*    (2006.01)
  *G06F 13/14*   (2006.01)
  *G06F 13/28*   (2006.01)

(52) U.S. Cl.
  CPC .......... *G06F 3/0647* (2013.01); *G06F 3/0604* (2013.01); *G06F 3/0634* (2013.01);
  (Continued)

(58) Field of Classification Search
  None
  See application file for complete search history.

(56) References Cited

U.S. PATENT DOCUMENTS 5,774,110 A * 6/1998 Edelson ............... G06T 3/4007
                                                   345/601
6,112,017 A * 8/2000 Wise ................... G06F 9/3867
                                                   712/200
(Continued)

FOREIGN PATENT DOCUMENTS

CN      101923443 A    12/2010
WO   WO-2015085436    5/2015

OTHER PUBLICATIONS

International Search Report & Written Opinion received in PCT Application No. PCT/US2014/018073, Nov. 24, 2014, 9 pages.
(Continued)

*Primary Examiner* — Henry Tsai
*Assistant Examiner* — Christopher A Bartels
(74) *Attorney, Agent, or Firm* — Hewlett Packard Enterprise Patent Department

(57) ABSTRACT

A port processor to receive a read command in a target port. In response, use the target to process a data transfer that includes use of memory for the read transfer allocated by a storage array controller prior to receipt of the read command by the target port or while processing the data transfer and selectively mark such memory as repurposable. The port processor to receive a write command in the target port. In response to receipt of the write command, use the target to process a data transfer for the initiator associated with the write operation, wherein the process includes use of memory that the storage array controller pre-allocated or allocated based on receipt of the read command by the target port for the transfer to the storage array controller and marked as repurposable.

12 Claims, 6 Drawing Sheets

(52) U.S. Cl.
CPC .......... *G06F 3/0656* (2013.01); *G06F 3/0683* (2013.01); *G06F 13/14* (2013.01); *G06F 13/28* (2013.01)

(56) References Cited

U.S. PATENT DOCUMENTS

| | | | |
|---|---|---|---|
| 6,247,101 B1* | 6/2001 | Settles | G06F 13/362 711/145 |
| 6,353,874 B1 | 3/2002 | Morein | |
| 6,496,740 B1* | 12/2002 | Robertson | G06F 15/17 700/11 |
| 6,892,287 B1* | 5/2005 | Millard | H04L 12/5601 709/213 |
| 7,328,307 B2 | 2/2008 | Hoogterp | |
| 7,613,785 B2 | 11/2009 | Chen et al. | |
| 7,631,148 B2 | 12/2009 | Fair | |
| 7,707,320 B2* | 4/2010 | Singhai | H04L 47/10 709/250 |
| 7,752,386 B1 | 7/2010 | Aral et al. | |
| 7,809,693 B2 | 10/2010 | Lango et al. | |
| 7,864,758 B1 | 1/2011 | Lolayekar et al. | |
| 7,917,539 B1 | 3/2011 | Srinivasan et al. | |
| 7,934,023 B2 | 4/2011 | Basavaiah et al. | |
| 9,977,730 B2 | 5/2018 | Herzi et al. | |
| 2002/0010812 A1 | 1/2002 | Hoese et al. | |
| 2007/0094484 A1* | 4/2007 | Rychlik | G06F 9/30116 712/228 |
| 2007/0208821 A1 | 9/2007 | Pittman | |
| 2008/0235415 A1* | 9/2008 | Clark | G06F 17/5031 710/105 |
| 2008/0288730 A1* | 11/2008 | Heller, Jr. | G06F 12/0817 711/159 |
| 2010/0100679 A1 | 4/2010 | Balasubramanian et al. | |
| 2010/0332909 A1* | 12/2010 | Larson | G06F 11/3476 714/40 |
| 2011/0004732 A1 | 1/2011 | Krakirian et al. | |
| 2011/0035459 A1 | 2/2011 | Desai et al. | |
| 2011/0072197 A1 | 3/2011 | Lund et al. | |
| 2011/0131379 A1 | 6/2011 | Jain et al. | |
| 2011/0289252 A1 | 11/2011 | Hoese et al. | |
| 2012/0075930 A1 | 3/2012 | Patapoutian et al. | |
| 2012/0089854 A1 | 4/2012 | Breakstone et al. | |
| 2012/0110222 A1 | 5/2012 | Dang et al. | |
| 2012/0297043 A1* | 11/2012 | Davis | H04L 45/60 709/223 |
| 2013/0151646 A1 | 6/2013 | Chidambaram et al. | |
| 2013/0297898 A1* | 11/2013 | Pisek | G06F 3/0641 711/160 |
| 2014/0089582 A1 | 3/2014 | Kobayashi | |
| 2014/0281057 A1* | 9/2014 | Cohen | G06F 3/061 710/52 |
| 2015/0039821 A1* | 2/2015 | Sasaki | G06F 13/1663 711/105 |
| 2019/0370630 A1* | 12/2019 | Yang | G06N 3/02 |

OTHER PUBLICATIONS

Riedel, E. et al., "Sequential I/O on Windows NT™ 4.0—Achieving Top Performance," (Research Paper), Proceedings of the 2nd USENIX Windows NT Symposium, Dec. 13, 2013, 32 pgs, available at https://www.google.co,in/url?sa=t&rct=j&q=&esrc=s&source=web&cd=1&cad=rja&ved=0CCoQFjAA&url=http%3A%2F%2Fresearch.microsoft.com%2Fpubs%2F684792Fseqio.doc&ei=-7GdUq3aBleTrgem3oHADw&usg=AFQjCNF98PlhQpcYI1IJoxe___PI806LYaXg&sig2=wNk7U1GZONhzFfhDOP4-bQ&bvm=bv.57155469,d.bmk.

Chris Siebenmann, "Understanding the iSCSI protocol for performance tuning," Apr. 29, 2011, <https://utcc.utoronto.ca/~cks/space/blog/tech/UnderstandingiSCSIProtocol.>.

International Preliminary Report on Patentability received in PCT Application No. PCT/US2014/018073, Sep. 9, 2016, 6 pages.

International Search Report and Written Opinion received for PCT Patent Application No. PCT/US2013/067787, dated Jul. 25, 2014, 11 pages.

Mcdata's Multi-Protocol SAN Technology, (Research Paper); Mar. 31, 2004, 12 pages.

Nixon, Bob; "First Burst Simplification"; Jul. 16, 2003; 3 pages.

\* cited by examiner

REPURPOSABLE BUFFERS FOR TARGET PORT PROCESSING OF A DATA TRANSFER

BACKGROUND

A computer may access a storage area network (SAN) for purposes of storing and retrieving large amounts of data. The typical SAN includes a consolidated pool of mass storage devices (magnetic tape drives, hard drives, optical drives, and so forth), and the SAN typically provides relatively high speed block level storage, which may be advantageous for backup applications, archival applications, database applications and other such purposes.

DETAILED DESCRIPTION

Figure 1:
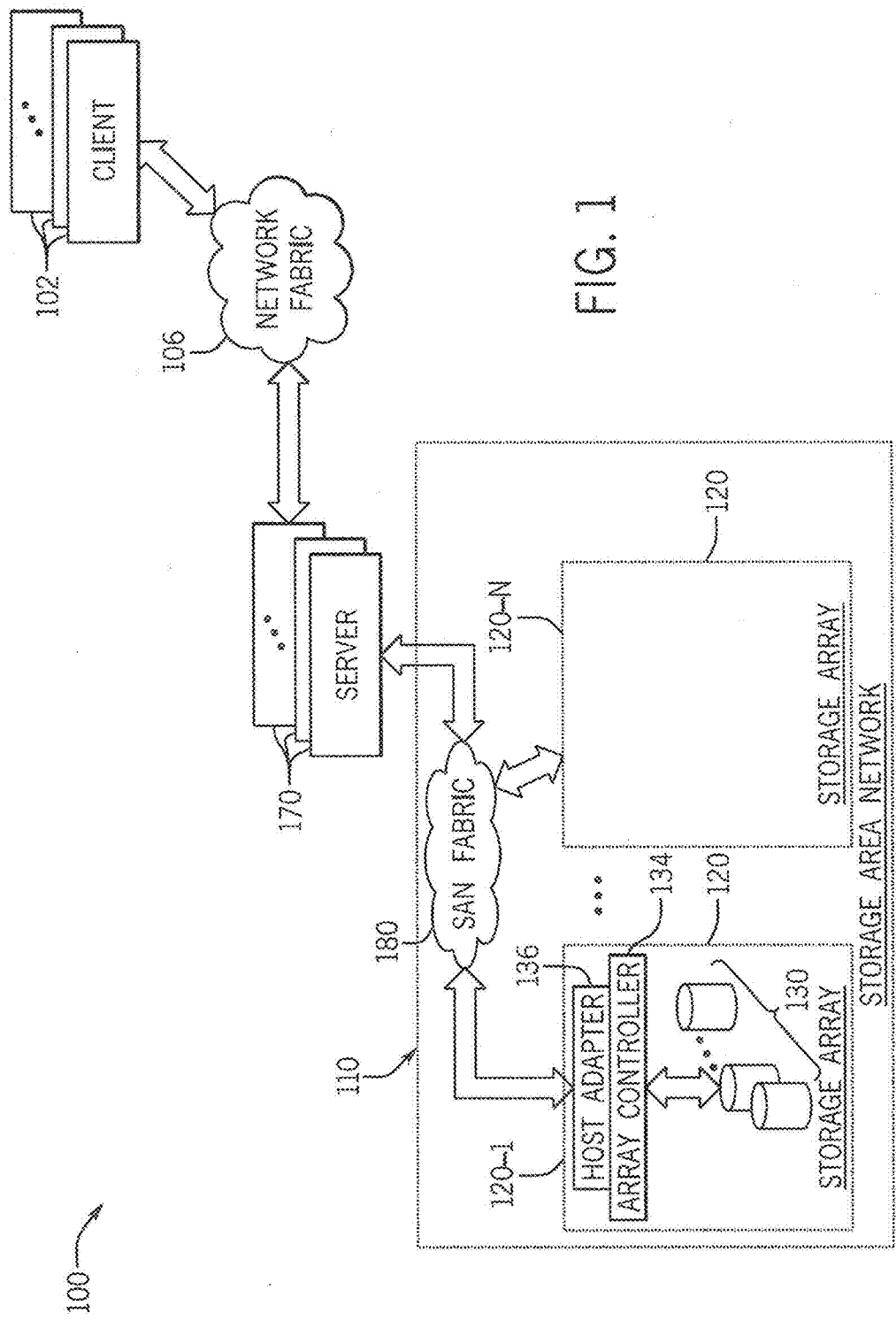
FIG. 1 is a schematic diagram of a computer system according to an example implementation.

A storage area network (SAN) may include storage arrays which may generate multiple interrupts while processing input/output (IO) requests from hosts. Reducing the interrupt load may improve processor or central processing unit (CPU) utilization of the storage array controllers associated with the storage arrays. Optimizing write request processing by prepopulating a host bus adapter (HBA) of the storage array with buffers may improve latency. Further, reusing read data buffers may also reduce processor utilization. However, not all read buffers may be repurposed. In one example of the techniques of the present application, the storage array controller may specify to the HBA which read buffers may be repurposed in write buffer pools for subsequent write operations. The HBA may then automatically repurpose those read buffers for subsequent write operations.

In one example, the storage array controller may be configured to post read data buffers to the HBA. The storage controller may also specify whether those buffers may be repurposed for future write operations. At the conclusion of the read request, the HBA may move or transfer those data buffers that are marked as repurposable into a pool of buffers that it will use for subsequent write operations to write data into. When the storage array controller posts the data for a read request to the HBA, it then performs the following steps. For example, for each buffer in the set of buffers containing read data, the storage array controller determines whether the content of the buffer is needed after the read request completes. If the storage array controller determines that the contents of the buffer are not necessary for subsequent functions, then it marks the buffers as repurposable for subsequent write operations. The storage array controller then posts the buffers to the HBA, and posts the status of read request to the HBA. The storage array controller also instructs or triggers the HBA to complete the read operation including communicating with the source of the request such as a host or server over a network.

The storage array controller may be configured to communicate with the HBA. In one example, the HBA may be configured to process buffers in the following manner. For each buffer that the storage array controller posts to the HBA, it performs or executes a direct memory access (DMA) transfer process to read the content of the buffer and then transmit or send the data to hosts. If the buffer has been marked as repurposable by the storage array controller, then the HBA adds the buffer to the write buffer pool and then sends or transmits the status to the host over the network. In another example, the HBA may transmit the status to the host prior to adding repurposable buffers to the write buffer pool. The buffers in the write buffer pool may be used to improve the performance of write operations.

In another example, the techniques of the present application provide a port processor configured to receive a read command in a target port. In response, the target processes a data transfer that includes use of memory for the read transfer allocated by a storage array controller prior to receipt of the read command by the target port or while processing the data transfer and selectively marks such memory as repurposable. The port processor may subsequently receive a write command in the target port. In response to receipt of the write command, the target processes a data transfer for the initiator associated with the write operation, wherein the process includes use of memory that the storage array controller pre-allocated or allocated based on receipt of the read command by the target port and marked as repurposable.

The techniques of the present application may provide advantages. For example, in the absence of read buffer repurposing techniques of the present application, write optimization may rely solely on the processor or CPU in the storage array controller to prepopulate and replenish the write buffer pool. The techniques of the present application provide read buffer repurposing which prepopulates the write buffer pool with no further intervention by the processor of the storage array controller. This may help improve processor utilization. This may also help reduce the likelihood of the write buffer pool becoming empty. The techniques of the present application may help reduce the overhead involved in buffer ownership transfer back to the storage array after the status phase completes when processing a read command.

Referring to FIG. 1, in accordance with example implementations, a computer system 100 includes a storage area network (SAN) 110, which contains a consolidated pool of physical media storage devices 130 (magnetic tape drives, optical drives, hard disk drives, combinations of these devices, and so forth), which may be used by clients 102 (desktop computers, portable computers, tablet computers, smartphones, and an forth) for data storage and retrieval purposes.

As an example, the clients 102 may communicate with various servers 170 (databases, email servers, file servers, and so forth) of the computer system 100, and as a result of these communications, the servers 170 may generate block-level access requests to store and retrieve data to and from the SAN 110. For the example of FIG. 1, the clients 102 may communicate with the servers 170 using network fabric 106, such as local area network (LAN)-based fabric, wide area network (WAN)-based fabric, Internet-based fabric, and so forth.

In general, the block-level reads and writes that are generated by the servers 170 are processed by storage array controllers 134 of storage arrays 120 (N storage arrays 120-1 . . . 120-N, being depicted in FIG. 1) of the SAN 110 for purposes of storing the data in and retrieving data from physical storage devices 130 of the arrays 120.

As depicted in FIG. 1, the servers 170 are coupled to the storage arrays 120 by SAN fabric 180, which may, as examples, contain Fibre Channel (FC) fabric, Internet Protocol (IP)-based fabric, switches, gateways, FC-to-SCSI bridges, and so forth, as can be appreciated by the skilled artisan.

In accordance with example implementations that are disclosed herein, the servers 170 communicate with the storage arrays 120 using a messaging protocol that complies with a Fibre Channel Protocol (FC) or an Internet Small Computer Systems Interface (iSCSI) protocol; and more specifically, a server 170 may initiate a given read or write operation by providing a message that targets a specific host adaptor port. In another example, the techniques of the present applications may be applicable to communication techniques such as Fibre Channel over Ethernet (FCoE) and other transport mechanisms. Although reference is made to FC, FCoE, and iSCSI, it should be understood that the techniques of the present application may be applied to other transports.

In general, in accordance with example implementations, a given storage array 120 contains one or multiple host adapters (HBAs) 136. The host adapter 136 provides a front end interface that is constructed to communicate with the servers 170 and present the storage on the drives 130 of the storage array 120 as logical units. The storage array 120 further includes a storage array controller 134 that, among its other functions, performs logical-to-physical storage unit conversions and provides a back-end interface to communicate with the associated drives 130 of the storage array 120.

In the context of the following discussion, for a given write or read that transfers data between a server 170 and a storage array 120, an "initiator" (a host port of a server 170, for example) initiates the write or read operation with a given "target" port (a port of the host adaptor 136, for example) by providing a message that identifies the target port, contains a write/read command and specifies one or multiple characteristics of the associated write/read operation. The message may be an information unit (IU) (for FC/FCoE) or a protocol data unit (PDU) for (iSCSI protocol).

A given target and initiator may undergo a login process that sets up how data transfers occur between the two entities. For example, as a result of the login process, a given target port may be designated as being capable of receiving unsolicited data (or "immediate" data) that accompanies a write command in a message from the initiator.

Alternatively, the login process may result in designating a target port to not receive unsolicited data with a write command. For this latter configuration, the target port controls the timing of when the initiator provides the data associated with the write in that the initiator does not provide the write data until the target port responds with a message indicating the target port's readiness to receive the write data. This may otherwise be referred to as the target port providing an XFR_RDY (for FC/FCoE) or R2T (for iSCSI protocol) signal.

Turning now to a more specific example, an initiator may generate a message that contains a write command that targets a specific port of a host adapter 136. For this example, and other examples described herein, the target port is configured to not receive unsolicited data with a write command. Instead, for a write operation, the initiator waits for the target port to provide an indication of readiness to receive the write data before the initiator provides the data to the target port.

When a target port receives data as part of a write operation, the target port transfers the data into a region of main memory of the storage array controller 134, which the storage array controller 134 allocates for this purpose. At any one time, the main memory of the storage array controller 134 may be allocated to receive data from multiple ongoing write operations.

One way to handle the processing of a write command that is received at a target port is for the storage array controller to be directly involved in the data transfer phase of the write operation. In this approach, the storage array controller controls when the target port asserts (to the initiator) its readiness to receive the write data. Moreover, the storage array controller allocates regions of its main memory for receiving write data among the target ports as write commands are received and as memory becomes available.

More specifically, in the direct approach, in response to receiving a write command, the target port first notifies (via an interrupt, for example) the storage array controller about the command. The storage array controller then allocates part of its main memory to receive the associated write data and informs the target port about the allocation. After receiving the memory allocation, the target port responds to the initiator with an indication of readiness (i.e., the target port provides a message with the XFR_RDY or R2T signal), and the initiator responds by transferring the data to the target port.

SCSI write transactions may be handled in a way to reduce the number of interrupts per transaction on the target and improve CPU utilization and latency. One technique to reduce the number of interrupts per transaction on the target (and reduce the latency of SCSI write requests) is a SCSI standard-based "first burst" technique in which the target receives a burst of unsolicited data with the write command. The first burst feature is set up by the initiator and target negotiating the first burst feature in a login process, so that when the target is configured to receive first bursts, the target uses pre-allocated buffers. Therefore, when the initiator sends a write command, the write command is accompanied with write data, and the target uses the pre-allocated buffers to store the data before interrupting the array controller. The first burst technique, however, may not be used if the initiator is not constructed or configured to implement first bursts.

In accordance with example techniques that are disclosed regarding write optimization mechanisms, buffers on the target host bus adapter are pre-allocated for non-first burst write transactions, which also allows a reduction in the number of interrupts without initiator involvement and does not depend on the ability of the initiator to be enhanced in any manner.

In this manner, systems and techniques are disclosed herein to optimize writes (optimize SCSI writes, for example) by pre-allocating memory for the transfer of the associated write data between an initiator and a target port. In this context, "pre-allocated" memory refers to one or more multiple regions of the storage array controllers memory that are allocated by the controller for exclusive use by a given port for future write operations. The pre-allocation means that the storage array controller 134 is not directly involved in the data phases of certain write operations. In this manner, in accordance with example implementations disclosed herein a given target port may be constructed to, for a certain write operation, communicate with an initiator to transfer write data to the target port and store the data in a pre-allocated memory region of the storage array controller 134, all without involvement by the storage array controller 134. Therefore, among possible advantages, overhead may be offloaded from the storage array controller 134 to the target port, and times associated with the transfer of write data may be decreased.

More specifically, in accordance with example implementations, the storage array controller 134 programs a given port of the host adaptor 136 with one or multiple parameters that characterize a class of write operations whose data transfers are handled by the port using pre-allocated memory. For use by the port for qualifying write operations, the array controller 134 pre-allocates one or more memory buffers to the given port.

In accordance with example implementations, a given port has exclusive access to its allocated memory buffer(s) for the designated class of writes until the port releases the allocated memory buffers back to the storage array controller 134. If a given write command does not fall within the designated class, then the storage array controller 134 is directly involved in the data phase: the target port alerts the storage array controller 134 to receipt of the command; and the target port waits for the storage array controller 134 to allocate memory for the transfer of the associated write data before the target port sends a message to the initiator indicating readiness to receive the write data.

Figure 3:
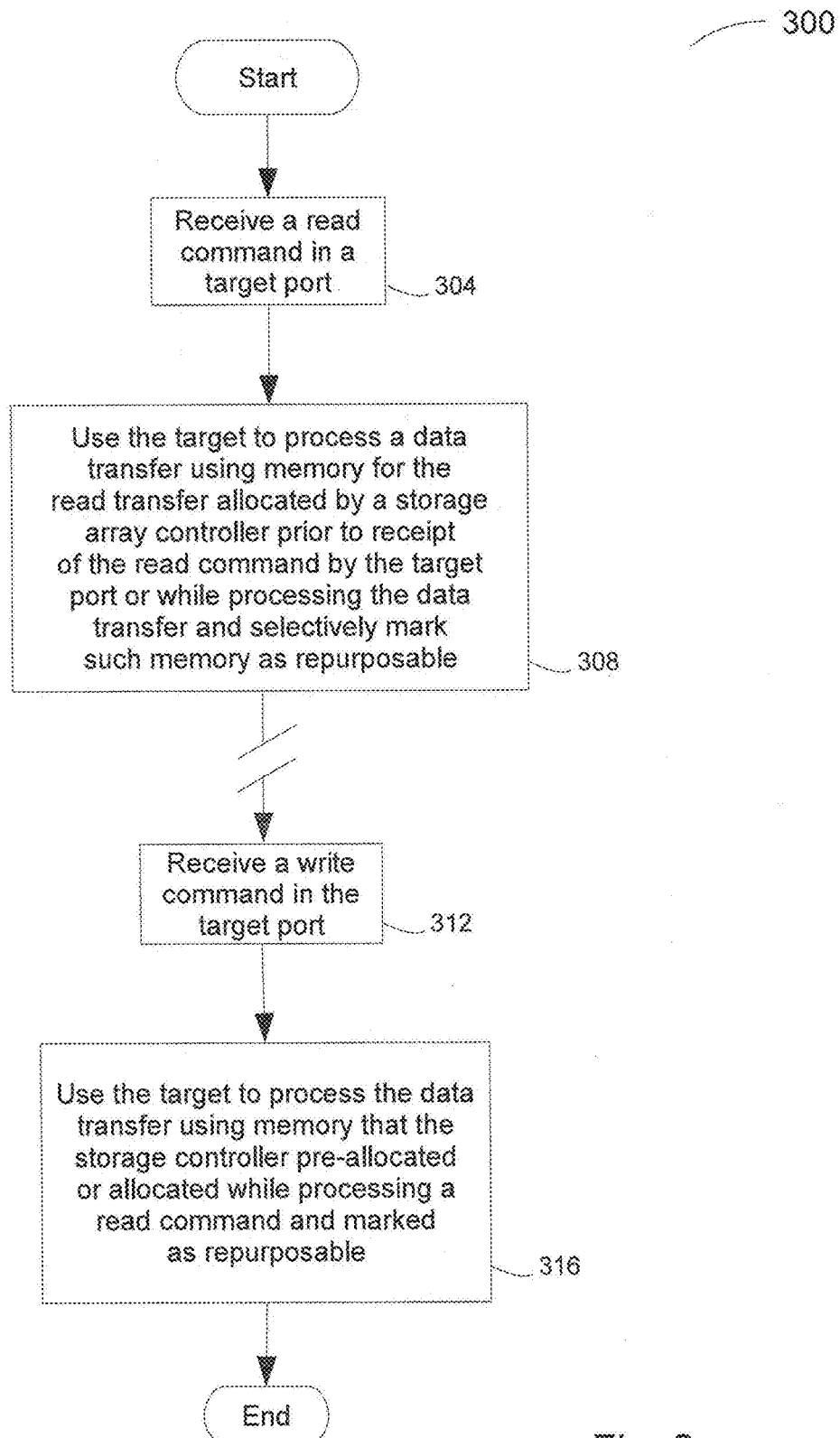
FIGS. 3, 4, 5 and 6 are flow diagrams depicting target processing of a command according to example implementations.

In one example, the techniques of the present application may improve the read process or operations by providing buffers for enhanced or optimized write buffer pools. Referring to FIG. 3, in accordance with example implementations, a technique 300 includes receiving a read command at block 304. In one example, the read command may be provided by an initiator and may be associated with a read operation. Processing proceeds to block 308 where the target processes a data transfer using memory for the read transfer allocated by a storage array controller prior to receipt of the read command by the target port or while in process of the data transfer and selectively marks such memory as repurposable. Once the read process is completed, a write process may be executed in response to write requests to use the repurposed read buffers for write processing. In other words, the read operations occur first to provide read buffers during read operations for reuse during subsequent write operations. The read process is independent of the write process. For example, processing proceeds to block 312 where the target receives a write command in the target port. In one example, the write command may be provided or sent by the initiator and may be associated with a write operation. Processing proceeds to block 316 where the target processes a data transfer using memory for the read transfer pre-allocated or allocated by the storage array controller based on receipt of the read command by the target port for the transfer to the storage array controller and marked as repurposable. In this manner, read buffers may be repurposed which may be used to prepopulate the write buffer pool for subsequent write operations or commands with no further intervention by the processor of the storage array controller.

Figure 2:
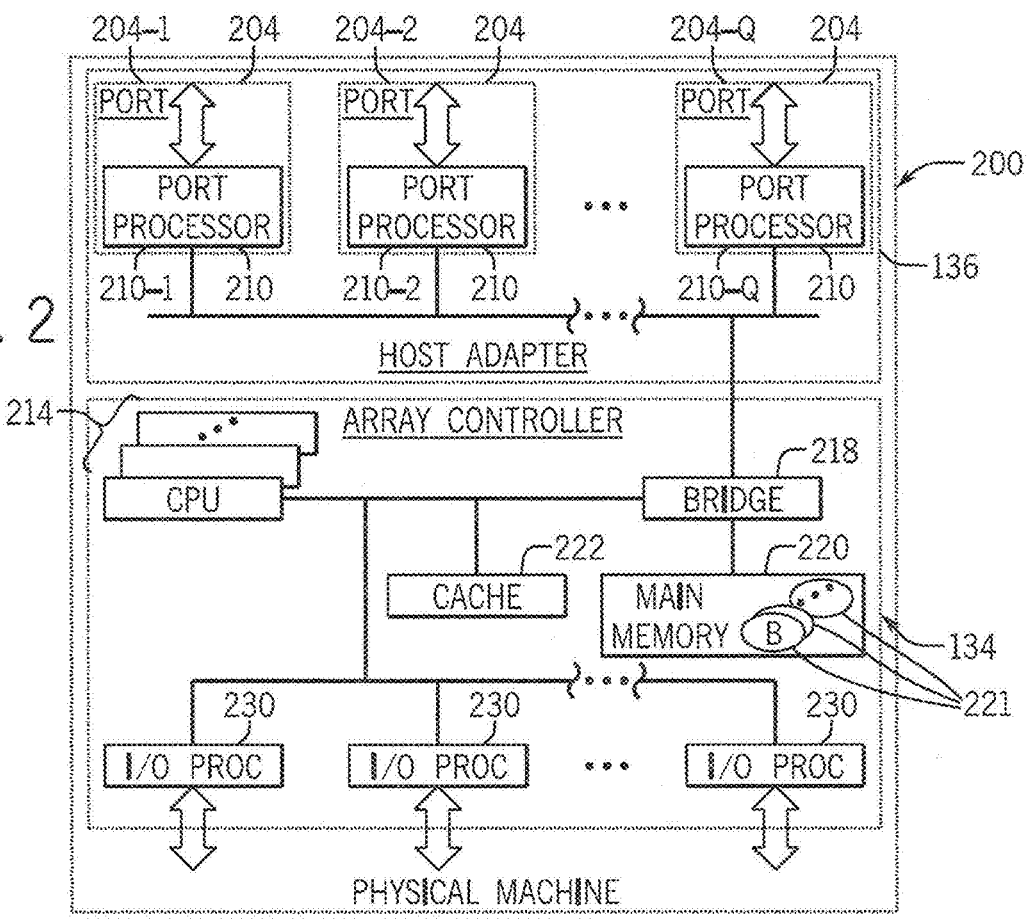
FIG. 2 is a schematic diagram of a physical machine of FIG. 1, which contains a host adaptor and a storage array controller according to an example implementation.

Referring to FIG. 2 in conjunction with FIG. 1, in accordance with example implementations, the host adaptor 136 and the storage array controller 134 may be part of the same physical machine 200. In this context, the physical machine 200 is an actual machine that is formed from actual hardware (central processing units (CPUs), memory devices, bus interfaces, and the like) and actual machine executable instructions, or "software" (operating system instructions, driver instructions, application instructions, and the like).

As an example, the storage array controller 134 may be formed from a main system board of the physical machine 200, and the host adaptor 136 may be formed by a host adaptor card that is inserted into a corresponding bus slot on the motherboard. In further implementations, the storage array controller 134 and the host adaptor 136 may be implemented further on the same motherboard. Thus, many variations are contemplated, which are within the scope of the appended claims.

As depicted in FIG. 2, in general, the host adaptor 136 may contain one or multiple port processors (Q port processors 210-1 . . . 210-Q, being depicted in FIG. 2) that form respective target ports 204 (Q target ports 204-1 . . . 204-Q, being depicted in FIG. 2 as examples). In some example implementations, a given port processor 210 is configured to process read and write operations for an assigned target port 204; and in further example implementations, a given port processor 210 may process read and write operations for multiple assigned target ports 204. As part of this processing, the port processors 210 handle data transfers associated with write commands within a predefined class using pre-allocated memory buffers, as described herein.

More specifically, in accordance with example implementations, the storage array controller 134 includes one or multiple central processing units (CPUs) 214, which are coupled to a main memory 220 of the storage array controller 134 via a bridge 218.

In general, the main memory 220 may temporarily store machine executable instructions, as well as data involved in the preliminary, intermediate and final results associated with this processing. In one example, the memory may be organized as two types of memory: instructions may be stored in processor or CPU memory and storage-related data may be stored in data memory. In accordance with some implementations, the main memory 220 may store machine executable instructions that when executed by the CPU(s) 214 cause the CPU(s) 214 to perform all or part of the techniques that are disclosed herein, such as the techniques 300 and 400 (described below).

In general, the main memory 220 is a non-transitory storage medium that may be formed from semiconductor storage devices, optical storage devices, magnetic media-based storage devices, removable media devices, and so forth, depending on the particular implementation.

In accordance with example implementations, regions of the main memory 220 are allocated to receive incoming write data. More specifically, in accordance with example implementations, the memory 220 contains buffers 221 that receive incoming write data. The buffers 221 are designated regions of the main memory 220. The buffers 221 may each have the same length, or size; or the buffers 221 may have different sizes, depending on the particular implementation.

When a port processor 210 receives write data for an associated write operation, the port processor 210 performs a direct memory access (DMA) to the main memory 220 for purposes of storing the write data in the allocated buffer(S) 221. After the data has been transferred, the CPU(s) 214 may perform such functions as logical-to-physical data unit conversions and store the data in one or more of the storage devices 130 via one or multiple input/output (I/O) processors 230. The allocated buffer(s) 221 for a given write command may be pre-allocated before receipt of the write command or may be allocated after receipt of the write command, depending on whether the associated write falls within the qualifying, or designated, class.

In accordance with example implementations, the CPU(s) 214 identify a qualifying, or designated class of write operations to be handled by a given port processor 210 for a given port 204 and programs the port processor 210 accordingly. In this regard, the CPU(s) 214 may program a given port processor 210 with one or multiple parameters that describe the class of write operations, as well as program the port processor 210 with a pre-allocated pool of one or multiple buffers 221 to be used in the transfer of the write data to the main memory 220. In accordance with example implementations, the pre-allocated buffer(s) 221 are used exclusively by the assigned port 204.

Figure 4:
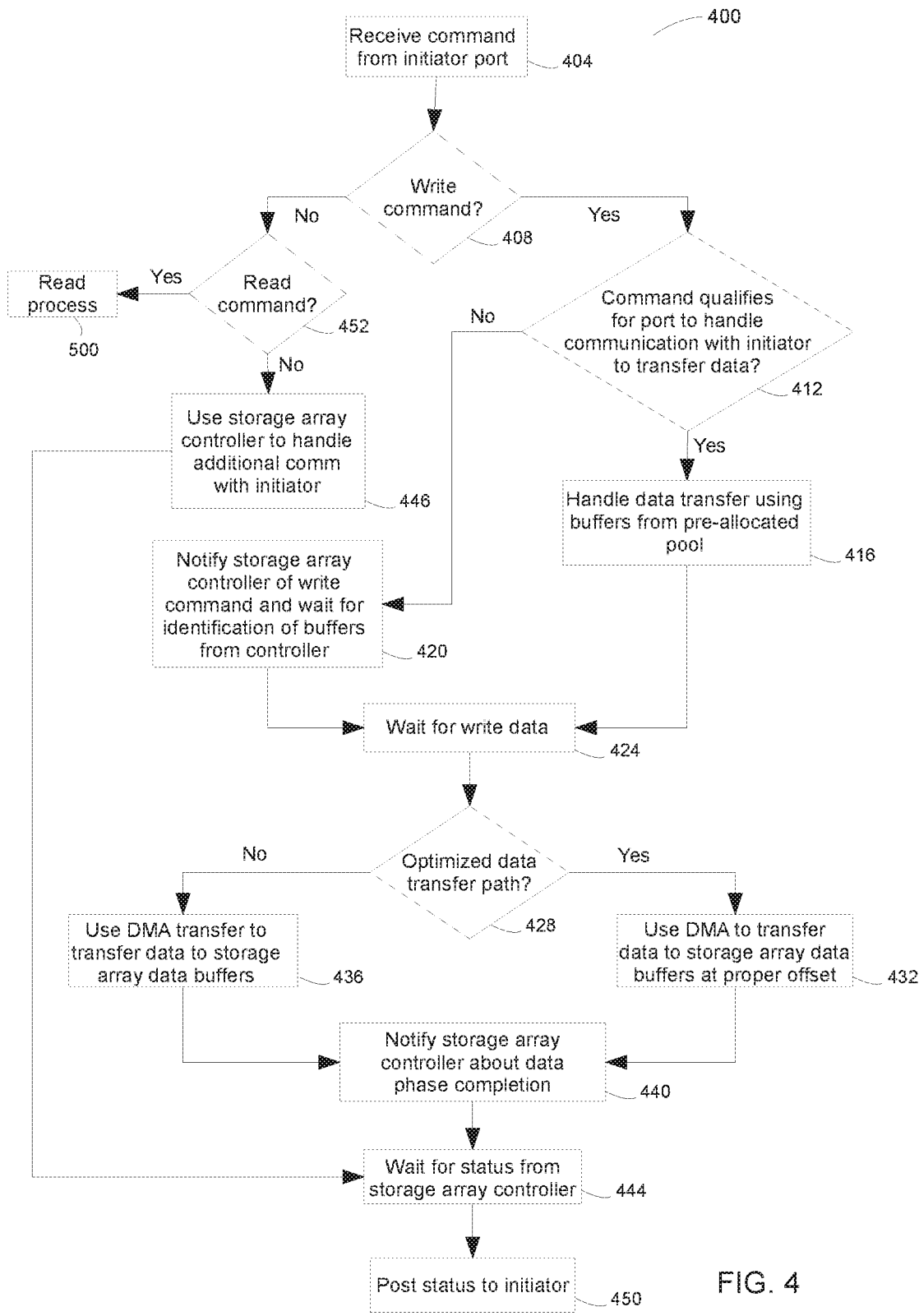

Referring to FIG. 4, as a more specific example, in accordance with example implementations, a write command may be processed by the storage array 120 pursuant to a technique 400. The technique 400 includes the target port receiving (block 404) a command from an initiator. If the target port determines (decision block 408) that the command is a write command, then the target port determines (decision block 412) whether the write command qualifies for the port to handle communication with the initiator to transfer the data using pre-allocated memory. If so, the target port uses (block 416) buffers from its pre-allocated pool to handle the transfer and indicates its readiness to the initiator, pursuant to block 416. If, however, the write command does not qualify (decision block 412), the port forwards (block 420) the request to the storage array controller, waits for the identification of the memory buffer(s) from the controller and then indicates readiness of the port to receive the data. As depicted in FIG. 4, after indicating its readiness to the initiator, the target port waits (block 424) for the write data.

As indicated by decision block 428, the transfer of the data to the memory of the storage array controller depends on whether the write is within the class to be handled using pre-allocated memory. In this manner, if the write is a qualified write, the target port uses DMA to transfer the data to the pre-allocated memory of the storage array controller at the proper offset, pursuant to block 432. Otherwise, the target port uses DMA transfer to transfer the data to the storage array buffers allocated after receipt of the write command, pursuant to block 436.

At the conclusion of the data transfer, the target port notifies (block 440) the storage array controller about the data phase completion. The target port then waits (block 444) for the status from the storage array controller and posts (block 450) the status to the initiator, pursuant to block 450.

Figure 5:
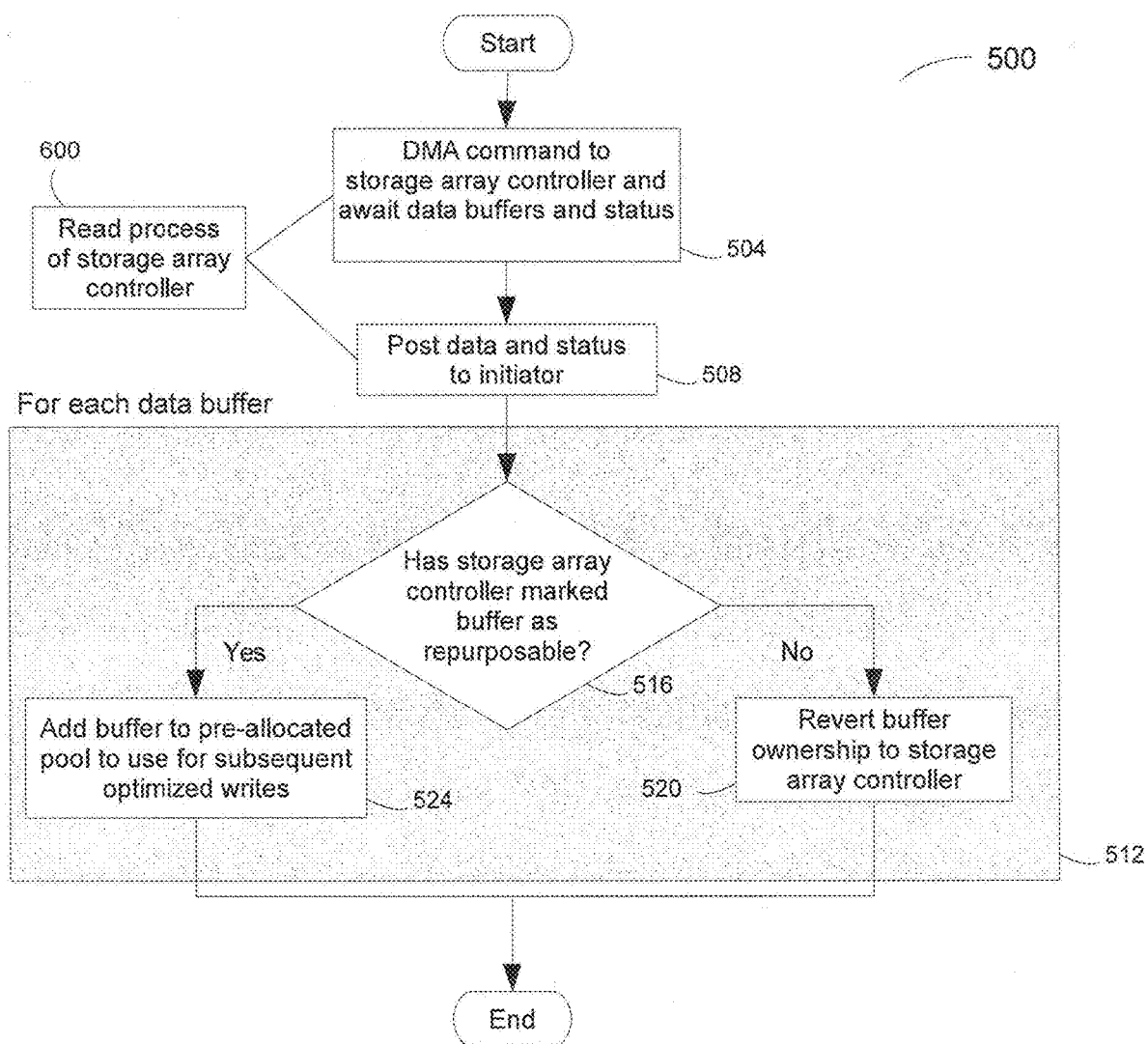

As depicted in FIG. 4, if the target determines that the command is not a write command (decision block 408), then the target port proceeds to determine whether the command is a read command (decision block 452). If the target port determines that the command is a read command, then processing proceeds to read processing block 500 as depicted in FIG. 5. On the other hand, if the target port determines that the command is not a read command, it uses the storage array controller to regulate the additional processing phases with the initiator, pursuant to block 446; and control proceeds to block 444.

Referring to FIG. 5, as a more specific example, in accordance with example implementations, a read command may be processed by the target or HBA pursuant to a technique 500. The technique 500 includes processing (block 504) commands from the target where, for example, the target may send read commands to the storage array controller using DMA and wait for data buffers and status from the storage array controller 134. In one example, if the target port (or port processor of the target port) determines that a read command has been received from the initiator, then the target port may transfer the read command via direct memory access (DMA) to the storage array controller and subsequently, when so indicated by the storage array controller, transfer the data from the memory of the storage array controller via DMA. The target may communicate with the storage array controller (block 600) as described in FIG. 6. Processing proceeds to block 508 where the target may post data and status to the initiator. For example, the target may respond to the read command from the initiator with requested data from storage device media 130 processed by storage array controller.

Figure 6:
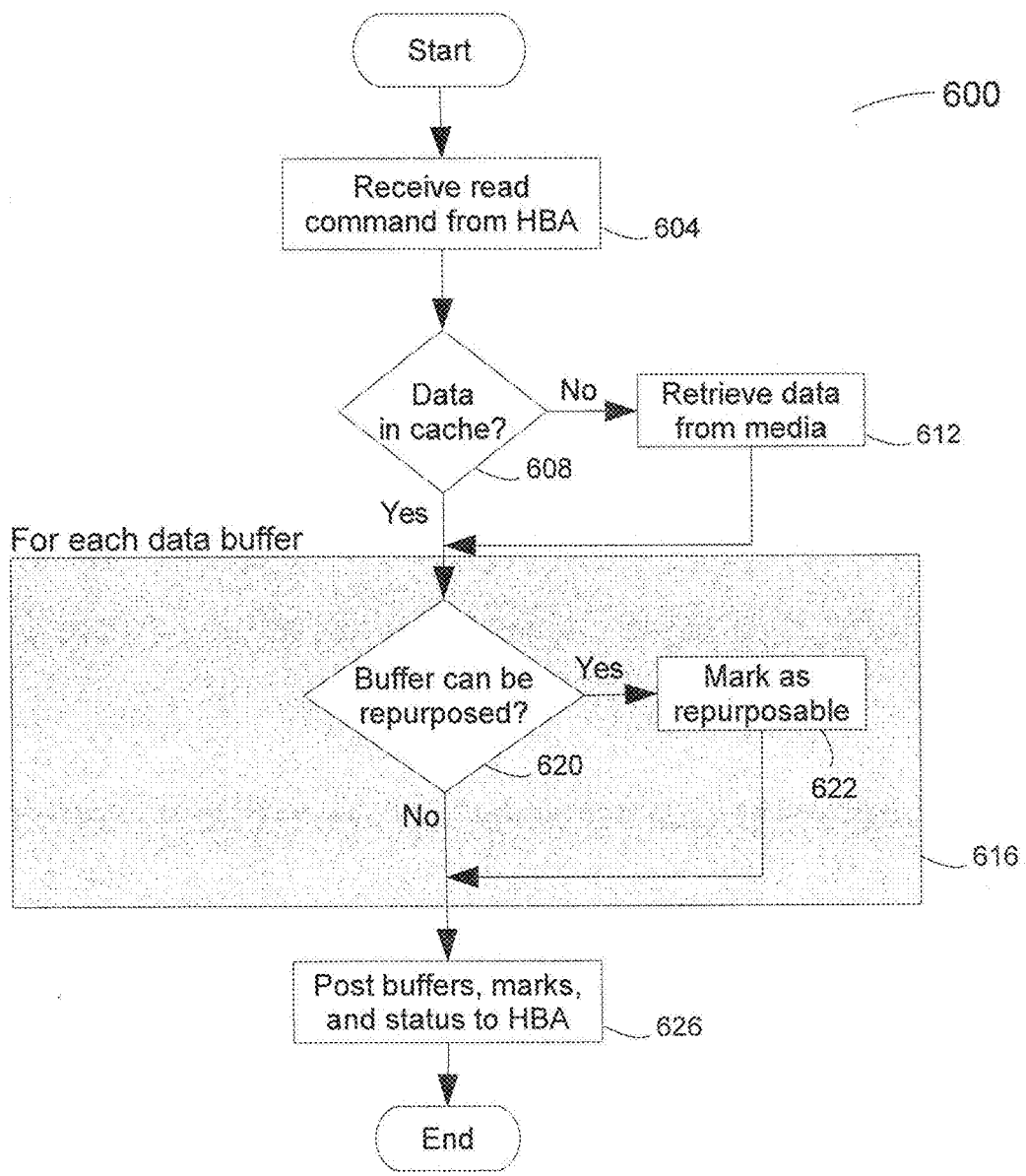

In one example, turning to FIG. 6, the storage array controller 134 receives the read command from the target port (block 604). The storage controller 134 may examine the command to determine information related to the read command such as the logical unit, offset, and amount of data requested. The storage controller 134 may check if the data requested is already in memory 220 (block 608). If it is not already stored or present in memory, the storage array controller may issue requests to I/O processors 230 to retrieve the data from media 130 (block 612). In one example, part of the data requested may be stored in memory while other parts may need to be retrieved from media. For each buffer, the storage array controller 134 may make a determination whether the buffer is repurposable by the target port for future optimized-write operations or commands (block 620). If so, the storage array controller 134 may mark the buffer as repurposable (block 622) which allows the target to use the buffer for a subsequent write operation or command from the initiator. The data buffers 221 thus accumulated along with their repurposable indications or marks may be provided to the target port (block 626). In one example, the storage array controller 134 may also post a status to the target port which the target may convey to the initiator (also in block 626). If all the functions used in retrieving the data were successful, the status may be indicated as a success. Otherwise, the status may be reported as an error. It should be understood that the above example is a simplified illustration of what occurs in the storage array controller. For example, if a buffer 221 is marked as repurposable, the target port may use the buffer to populate it with data in a future or subsequent write operation or command associated with the initiator. In this case, the content of the read buffer may be overwritten by data associated with the future write command. The original content of the buffer may need to be retrieved from media 130 if it is needed again unless another copy is available in memory 220. Thus, the storage array controller 134 may mark a buffer as repurposable only if its contents are not needed to satisfy a future operation.

Returning to FIG. 5, processing then proceeds to block 512 where the target port checks the mark of each buffer to determine whether the buffer has been marked as repurposable. In particular, the target port checks (block 516) each buffer to determine whether the storage array controller marked it as repurposable. If the target port determines that the storage array controller marked the buffer as repurposable, then processing proceeds to block 524. On the other hand, if the target port determines that the storage array controller did not mark the buffer as repurposable, then processing proceeds to block 520. At block 524, the target port adds the buffer marked as repurposable to the pre-allocated pool of the target port to use by the target port for subsequent optimized write operations or commands from received from the initiator. At block 520, the target port reverts the buffer ownership to the storage array controller. For example, since the buffer has not been marked as repurposable by the storage controller, the storage array controller may resume ownership of the buffer for subsequent operations.

Among the potential advantages of the techniques and systems that are disclosed herein, write operation performance may be improved by helping ensure that the pool of buffers has two sources. In one example, the storage array controller determines whether a read buffer may be repurposed for use as write buffer for a subsequent write operation. In addition, the storage controller may replenish write buffer pools as in write optimization techniques described herein. The storage array controller may experience a reduction in interrupt processing, and the storage array controller may experience a decrease in its CPU loading because the pre-allocated buffer pool is kept replenished by read-buffer repurposing in addition to the regular replenish method described with respect to the write optimization techniques herein. The systems and techniques disclosed herein may be especially beneficial for storage arrays that have a relatively high target port density. Other and different advantages are contemplated, which are within the scope of the appended claims.

While a limited number of examples have been disclosed herein, those skilled in the art, having the benefit of this disclosure, will appreciate numerous modifications and variations therefrom. It is intended that the appended claims cover all such modifications and variations.

What is claimed is:

1. A method comprising:
    receiving a read command in a target port, the read command being provided by an initiator and being associated with a read operation;
    in response to receiving the read command, using the target port to process a data transfer for the initiator associated with the read operation, wherein the processing includes using a read buffer of memory for the read transfer, the read buffer allocated by a storage array controller prior to receipt of the read command by the target port or while processing the data transfer, and selectively marking the read buffer of memory as repurposable;
    if the target port determines that the read buffer has been marked as repurposable for a subsequent write operation or command by the storage array controller, then the target port adding the read buffer so marked to a pre-allocated write buffer pool for a use in a subsequent write operation or command;
    receiving a write command in the target port, the write command being provided by an initiator and being associated with a write operation; and
    in response to receiving the write command, using the target port to process a data transfer for the initiator associated with the write operation, wherein the processing the data transfer associated with the write operation includes using the read buffer of memory that the storage array controller pre-allocated or allocated based on receipt of the read command by the target port for the transfer to the storage array controller and that is marked as repurposable.

2. The method of claim 1, wherein if the target port determines that a read command has been received from the initiator, then the target port sending the command to the storage array controller via a direct memory access (DMA) transfer and, subsequently, when so indicated by the storage array controller, DMA transferring the data from the memory of the storage array controller.

3. The method of claim 1, wherein if the target port determines that the read buffer has not been marked as repurposable for a subsequent write operation or command by the storage array controller, then the target port reverting ownership of the read buffer to the storage array controller for use by the storage array controller in subsequent operations or commands.

4. The method of claim 1, wherein, in response to receipt of a read command from the target port, if the data associated with the read command is not stored in memory of the storage array controller, then the storage array controller retrieving the read data associated with the read command from storage media device coupled to the storage array controller.

5. The method of claim 1, further comprising the storage array controller checking buffers associated with the read command to determine whether the buffers are to be marked repurposable for subsequent write operations or commands.

6. The method of claim 1, further comprising the storage array controller checking buffers associated with the read command to determine whether the buffers are to be marked repurposable based on the storage array controller determining that the read buffers are not needed for a subsequent command or operation.

7. An apparatus comprising:
    a storage array controller to allocate memory for data transfer; and
    a port processor to receive a read command in a target port, the read command provided by an initiator and associated with a read operation,
    the target port to, in response to receipt of the read command, process a data transfer for the initiator associated with the read operation, wherein the process includes use of a read buffer of memory for the read transfer, the read buffer allocated by the storage array controller prior to receipt of the read command by the target port or while in process of the data transfer, and selectively mark the read buffer of memory as repurposable;
    wherein the target port is to add the read buffer to a pre-allocated write buffer pool for use in a subsequent write operation or command, if the port processor of the target port determines that the read buffer has been marked as repurposable for a subsequent write operation or command by the storage array controller;
    the target port to receive a write command, the write command being provided by the initiator and being associated with a write operation, and
    the target port to, in response to receipt of the write command, process a data transfer for the initiator associated with the write operation, wherein the processing the data transfer associated with the write operation includes use of the read buffer of memory pre-allocated or allocated by the storage array controller based on receipt of the read command by the target port for the transfer to the storage array controller and that is marked as repurposable.

8. The apparatus of claim 7, wherein if the port processor of the target port determines that a read command has been received from the initiator, then the target port to transfer the read command via direct memory access (DMA) to the storage array controller and subsequently, when so indicated by the storage array controller, transfer the data from the memory of the storage array controller via DMA.

9. The apparatus of claim 7, wherein if the port processor of the target port determines that the read buffer has not been marked as repurposable for a subsequent write operation or command by the storage array controller, then the target port to revert ownership of the read buffer to the storage array controller for use in subsequent operations or commands.

10. The apparatus of claim 7, wherein in response to receipt of a read command from the target port, if the data associated with the read command is not stored in the memory of the storage array controller, then the storage array controller to retrieve the read data associated with the read command from storage media device coupled to the storage array controller.

11. An article comprising a non-transitory computer readable storage medium to store instructions that when executed by a computer to cause the computer to:
in response to receipt of read command, use a target port to process a data transfer for the read command, wherein the processing includes use of a read buffer of memory for a read transfer, the read buffer allocated by a storage array controller prior to receipt of the read command by the target port or while in process of the data transfer, and selectively mark the read buffer of memory as repurposable;
if the target port determines that the read buffer has been marked as repurposable for a subsequent write operation or command by the storage array controller, use the target port to add the read buffer to a pre-allocated write buffer pool for a use in a subsequent write operation or command; and
in response to receipt of a write command, use the target port to process a data transfer associated with the write command, wherein the processing the data transfer associated with the write operation includes use of the read buffer of memory pre-allocated or allocated by the storage array controller based on receipt of the read command by the target port for the transfer to the storage array controller and that is marked as repurposable.

12. The article of claim 11, wherein if the target port determines that a read command has been received from an initiator, then the target port configured to transfer the command to the storage array controller via a direct memory access (DMA) and subsequently, when so indicated by the storage array controller, transfer the data from the memory of the storage array controller via DMA.

* * * * *